United States Patent
von der Embse et al.

[19]

[11] Patent Number: 5,969,674
[45] Date of Patent: *Oct. 19, 1999

[54] METHOD AND SYSTEM FOR DETERMINING A POSITION OF A TARGET VEHICLE UTILIZING TWO-WAY RANGING

[76] Inventors: Urban A. von der Embse, 7323 W. 85th St., Westchester, Calif. 90045; Kenneth Yu Huang, 2310 Ives La., Redondo Beach, Calif. 90278; Donald C. D. Chang, 2350 Moberly Ct., Thousand Oaks, Calif. 91360

[*] Notice: This patent issued on a continued prosecution application filed under 37 CFR 1.53(d), and is subject to the twenty year patent term provisions of 35 U.S.C. 154(a)(2).

[21] Appl. No.: 08/803,936

[22] Filed: Feb. 21, 1997

[51] Int. Cl.[6] ........................................ G01S 5/01
[52] U.S. Cl. ...................................... 342/357.16
[58] Field of Search .................... 342/353, 357, 342/458, 453, 461; 455/441

[56] References Cited

U.S. PATENT DOCUMENTS

| | | | |
|---|---|---|---|
| 3,384,891 | 5/1968 | Anderson | 342/357 |
| 3,544,995 | 12/1970 | Bottenberg et al. | 342/357 |
| 5,444,450 | 8/1995 | Olds et al. | 342/357 |

OTHER PUBLICATIONS

Doc 9524, FANS/4–WP/76, International Civil Aviation Organization, Special Committee on Future Air Navigation Systems, Fourth Meeting, Montreal, May 2–20, 1988, Report, pp. 3.2B–2 & 3.2B–3.

*Primary Examiner*—Gregory C. Issing
*Attorney, Agent, or Firm*—Terje Gudmestad; Georgann Grunebach; Michael W. Sales

[57] ABSTRACT

A communication system transmitting messages includes two-way ranging by communicating between a target vehicle and a traffic controller station through a plurality of satellites. A set of the plurality of satellites may be used simultaneously or sequentially to transmit and receive signals from the ground station to a target vehicle, preferably an aircraft in the preferred embodiment. Each aircraft includes a particular ranging code combined with a message signal to selectively process the ranging data supplied to each vehicle. The ranging determination may be used in conjunction with alternative ranging devices, such as a global positioning system, in order to improve the accuracy of the estimations provided by the ranging processing. Nevertheless, the method and apparatus of the present invention provide relatively accurate state vectors without the need for precisely accurate timing synchronization at each of the stations connected by communication links.

4 Claims, 3 Drawing Sheets

METHOD AND SYSTEM FOR DETERMINING A POSITION OF A TARGET VEHICLE UTILIZING TWO-WAY RANGING

TECHNICAL FIELD

This invention relates to methods and systems for determining a position of a target vehicle, such as an aircraft or a surface vehicle, utilizing two-way communication links including multiple satellites and signal processing ranging techniques.

BACKGROUND ART

Current Automatic Dependent Surveillance (ADS) technology, such as Global Positioning System (GPS), Wide Area Augmentation System (WAAS) EGNOS, MTSAT or GLONASS, provides positioning information utilizing satellite communication. For example, the GPS, developed and deployed by the U.S. Department of Defense, consists of twenty-four satellites orbiting the earth twice a day at an altitude of 12,000 miles, as well as five ground stations to monitor and manage the satellite constellation. Using atomic clocks and location data, GPS satellites transmit continuous time and position information twenty-four hours a day to a GPS receiver, which listens to three or more satellites at once to determine the user's position on earth. By measuring the time interval between the transmission and the reception of a satellite signal, the GPS receiver calculates the distance between the user and each satellite, and then uses the distance measurements of at least three satellites to arrive at a position.

Such systems, however, utilize one-way ranging in which an accurate, synchronized clock is required at each station. Any synchronization error or error regarding the location of one of the satellites results in an error in the determined position of the target vehicle. An aircraft, or other target vehicle, must still have accurate position and velocity information and requires dedicated, precise equipment throughout the system to provide very accurate position and velocity information with a high degree of integrity and reliability.

In addition, a German system provides a novel non-cooperative near-range radar network for traffic guidance and control on airport surfaces, as stated in IEEE Trans. On Control System Technology, Vol. I, No. 3, September 1993. This ground-based tracking system uses non-cooperative radar for two-way transmission and employs triangulation ranging. Ground-based Loran-C systems require a hyperbolic electronic grid and are accordingly limited to local tracking. Other systems such as Radio Determination Satellite System (RDSS) using geostar and fire control, navigation and tracking systems with either non-cooperative or cooperative architectures are also limited ranging implementations.

DISCLOSURE OF THE INVENTION

The present invention overcomes the above-mentioned disadvantages by providing a method and system for determining a position of a vehicle, such as an aircraft or a surface vehicle, utilizing two-way ranging techniques through multiple satellites to derive independent estimates of a vehicle's state vectors including position and velocity.

In carrying out the above objects and other objects, features, and advantages of the present invention, a method is provided for determining the position of a target vehicle. The method includes transmitting a first signal to a vehicle from a traffic control station through a plurality of satellites, said vehicle acquiring and tracking a unique ranging code, and transmitting from said vehicle a message signal including said unique code representing said vehicle. The links through multiple satellites are sequentially or simultaneously processed to provide two-way ranging with reasonably accurate estimations of state vectors.

In further carrying out the above objects and other objects, features, and advantages of the present invention, a system is also provided for processing ranging measurements to derive estimations of vehicle state vectors in response to said first signal and said message signal at said traffic controller, preferably a ground-based traffic controller employing $\alpha$-$\beta$/EKF tracking.

BRIEF DESCRIPTION OF THE DRAWINGS

The above objects and other objects, features and advantages of the present invention will become readily apparent from the following detailed description of the best mode for carrying out the invention when taken in connection with the accompanying drawings, in which like reference characters refer to like parts throughout the views and in which.

BEST MODES FOR CARRYING OUT THE INVENTION

Figure 1:
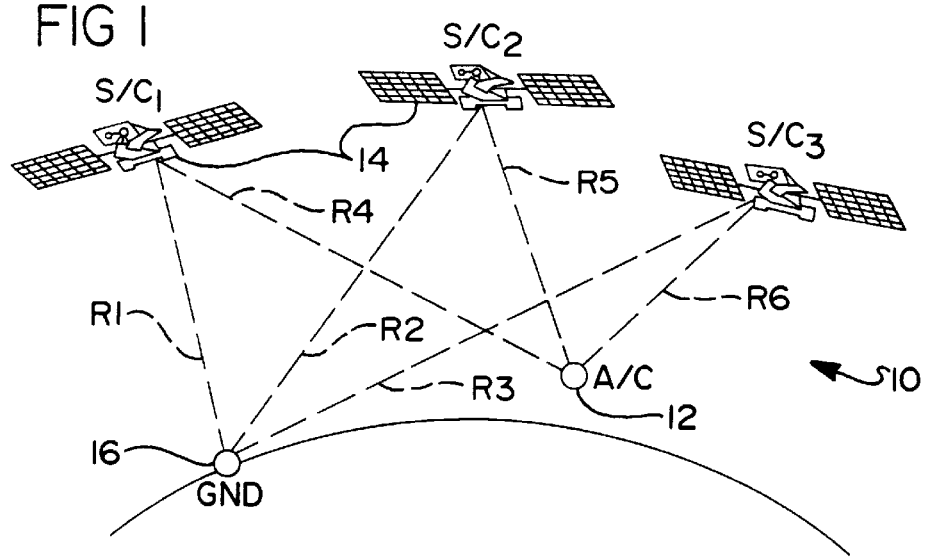
FIG. 1 is a diagrammatic representation illustrating a communication system employing the method and apparatus of the present invention.

Referring first to FIG. 1, a communication system 10 with a typical geometry for practicing the present invention is diagrammatically illustrated. In general, the system includes a vehicle target, represented by an aircraft 12 in the preferred embodiment, although Earth bound vehicles or individual portable units are also trackable in the present invention. A plurality of communication satellites 14 are within the field of view of the aircraft 12 at a given time through which each aircraft 12 communicates with at least one traffic controller 16.

The communication satellites 14 are preferably in multiple planes using Low Earth Orbit (LEO) although Medium Earth Orbit (MEO) satellite constellations such as Iridium, Globalstar and Intermediate Circular Orbit (ICO), now a world enterprise in London that has deployed satellites. For example, the planned ICO configuration with ten to twelve satellites in two planes is best suited for the application and more than adequate to implement the position location and tracking of the aircraft 12 for navigation and landing aid up to International Civil Aviation Organization (ICAO) Category I while providing the necessary global coverage, and communication needs for Air Traffic Management (ATM).

Multiple dynamic communication links between an aircraft 12 and the satellite ground station 16, a Satellite Access Node (SAN), preferably with traffic control monitoring, processing, signaling, and is achieved via the plurality of communication satellites 14 which is then utilized to derive independent estimates of the positions and velocities (state vectors) of the aircraft 12. The ground station 16, such as a Satellite Access Node (SAN), transmits a ranging signal to the targeted aircraft 12 via one of the communication satellites 14. The aircraft 12 then retransmits a data message, including a unique ranging code, back down to the ground station 16 via the same communication satellite 14. There are multiple links available, for example, through 3 different satellites most of the time, but at least two satellites from the ICO constellation are always within the field of view of the aircraft 12. A set of the plurality of satellites within the field of view may be employed simultaneously through two satellites, or sequentially through a single satellite without departing from the scope and spirit of the present invention.

The positions in space of the ICO communication satellites 14 are known so that the ranges $R_1$, $R_2$, and $R_3$ between each of the communication satellites 14 and the traffic controller station 16 is known. The links $R_4$, $R_5$, and $R_6$ are then employed to determine the state vectors by two-way ranging from the traffic controller station 16 to the aircraft 12. The time difference between the time at which the ranging signal is transmitted by the traffic controller station 16 and the time at which the responding ranging signal from the aircraft 12 is received by the satellite ground station is used in determining the ranges $R_4$, $R_5$, and $R_6$.

In the configuration, in which the forward and return ranging signals propagate through the same link, the equal range locations of the measurement is confined on a spherical surface centered on the relay satellite position with a constant radius (range) equal to a distance between the aircraft 12 and the relay satellite.

In determining the position and velocity of the aircraft 12, the present invention may be utilized in conjunction with GPS. When GPS signals are available, the GPS signals are used to derive the aircraft state vector which is then transmitted to a ground Air Traffic Controller (ATC) facility 16 via the communication satellites 14. Simultaneously, ranging signals are sent by the satellite ground station 16 via the communication satellites 14 to the targeted aircraft 12. The aircraft 12 then retransmits this ranging signal on a return link back to the station 16. The returned two-way ranging signals are detected and tracked in time and frequency by the station 16. Measured time and frequency values from multiple satellite links are compared to predicted values. Improved estimation of the aircraft state vectors is accomplished through data fusion of the two independent measurements, i.e, the GPS measurement and the two-way ranging measurement. The updated aircraft state vectors are then transmitted back to the aircraft 12.

Figure 2:
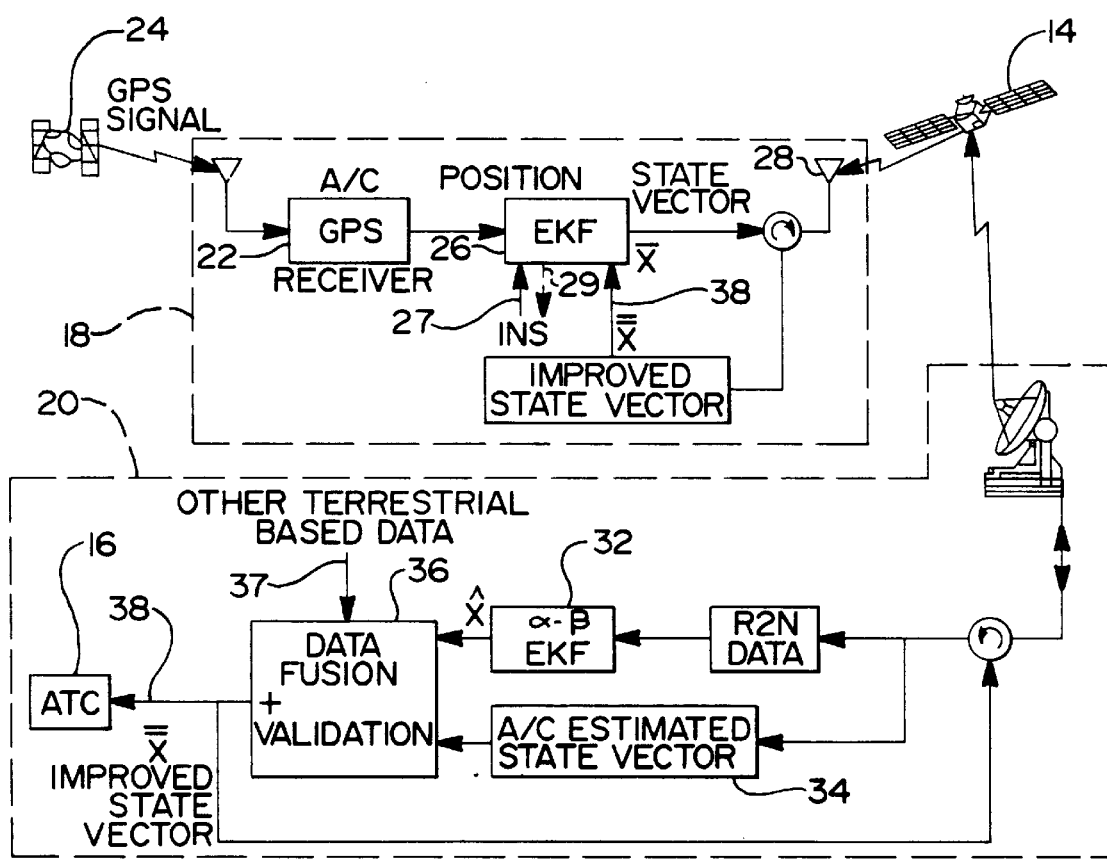
FIG. 2 is a block diagram of segments included in the system shown in FIG. 1.

Turning now to FIG. 2 there is shown simplified block diagrams of both the aircraft segment 18 and the ground segment 20 of the present invention. The aircraft segment 18 includes a conventional GPS receiver 22 for receiving GPS signals from a GPS satellite 24 via an antenna 25. The GPS receiver 22 transmits a position signal to a conventional Extended Kalman-Filter (EKF) 26 which tracks the position signal as a state vector. An optional input 27 to the EKF 26 is a signal from an Inertial Navigation System (INS), such as a conventional mechanical gyro system which monitors the distance traveled by the aircraft 12 from a predetermined position, and INS error estimates 29 are sent back to the INS for correction.

The aircraft 12 receives the ranging signals from the ICO communication satellites 14 via a second antenna 28. The second antenna 28 is preferably a retrodirective antenna implemented with a Butler matrix, a low-profile digital beam former, and Wavelet-based Finite-Impulse-Response (WFIR) signal processing. The retrodirective antenna measures the direction of the received signal from the communication satellite 14 and automatically transmits the return signal back to the same communication satellite 14. The Butler matrix implements a Fourier transform forming a set of nearly orthogonal beams covering the field-of-view and is a relatively inexpensive approach to realizing a retrodirective antenna. The low-profile digital beam former array lends itself to a thin conformal array configuration which is preferred for aircraft installation. Optionally, a tracking antenna can be used in place of the retrodirective antenna, which consists of either an electronically or mechanically steered antenna driven by a monopulse, step-scanned, or conically-scanned tracking loop.

Figure 3:
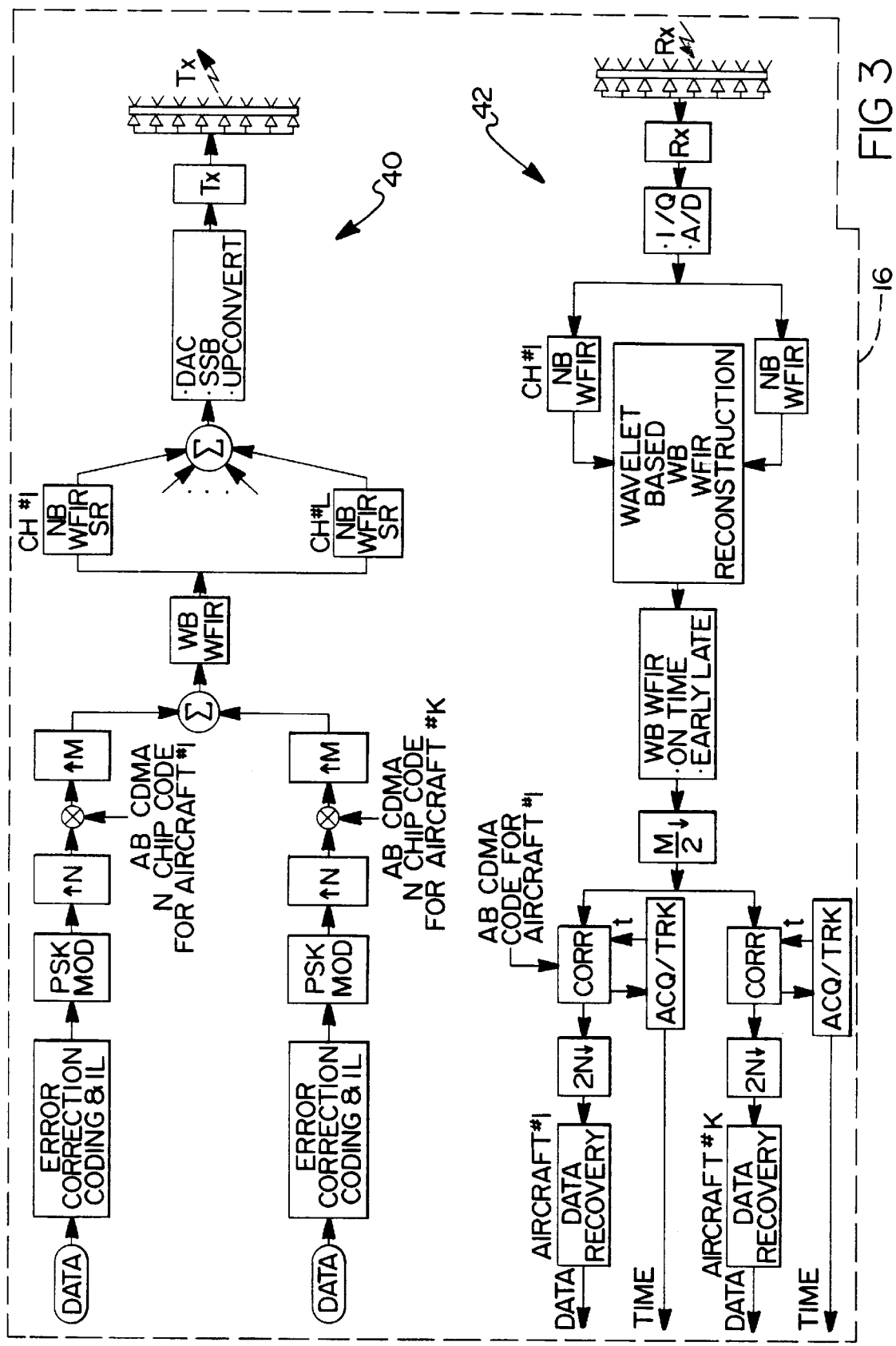
FIG. 3 is a block diagram of a preferred transmitter and a preferred receiver traffic controller station used in the system of FIG. 1.

The message data between the aircraft segment 18 and the ICO ground segment 20 can be combined with the unique ranging code signal in one of several ways. One way is by overlaying an Auslander-Barbano (AB) Code Division Multiple Access (CDMA) tracking code on the communication link channels as low-level Additive White Gaussian Noise (AWGN), thermal noise-like signals which slightly raise the thermal noise floor. This process is described in reference U.S. patent application Ser. No. 08/657,250, filed Aug. 5, 1996 entitled "New CDMA Code Generator Employing Mixing Ergodic Transformation", incorporated herein by reference. Another way is by modulating the communication data with the AB CDMA ranging code and sent as a single waveform as shown in FIG. 3. A third way is by separating the ranging links from data links. In the preferred embodiment shown in FIG. 3, the ATC facility 16 transmits data which is modulated by a WFIR waveform with a unique AB ranging code assigned to each aircraft 12 being tracked in the access time slot. WFIR modulation enables the ranging signals to have variable resolution in addition to variable length. The waveform specifically provides a means to transmit a relatively wide-band WFIR ranging waveform over a group of narrow-band communication satellite 14 channels, simultaneously or sequentially, and supports simultaneous ranging/doppler measurements and data demodulation.

The two-way ranging data 30 is sent to the ground segment 20 via the ground station 16. The two-way ranging data 30 is used to drive a dual alpha-beta ($\alpha$-$\beta$)/EKF tracking loop 32 wherein the fast $\alpha$-$\beta$ loop tracks the AB CDMA code in communication coordinates, and the slow EKF tracks the target aircraft 12 in earth centered inertial (ECI) coordinates to provide a unique preferred tracking architecture with low-complexity, high accuracy, and high integrity with fast-response valid-track metrics, and the ability to track out time delay variation due to ionospheric total-electron-content (TEC) variation induced waveform transmission range and doppler offsets.

The $\alpha$-$\beta$ loop is a relatively fast pair of time and frequency tracking loops which measure and smooth the received two-way ranging signals during each access. The four dimensional state vector Z for the $\alpha$-$\beta$ loop consists of the timing offset, time drift, frequency offset and frequency drift. Time drift refers to clock drift whereas frequency offset refers to doppler shift due to link motion plus total electron content (TEC). The state vector X for the EKF loop has eleven components consisting of the 3-dimensional ECI position coordinates, velocity, acceleration, and the ranging plus doppler coordinates associated with ionospherical TEC effects.

Based on the $\alpha$-$\beta$ observation data from a previous access, the EFK loop predicts ahead its state $\hat{X}_k$ at the state transition time k*T, where T is the update interval for the EKF. This state is mapped into the corresponding predicted state $\hat{Z}_k$ of the $\alpha$-$\beta$ loop. During the access slot time $\Delta$T, the $\alpha$-$\beta$ loop generates a smoothed state $Z_k$ which is then used by the EKF to smooth the predicted state to generate the smoothed state $X_k$. This allows the EKF to predict ahead the state $\hat{X}_{k+1}$ at $(k+1)*T$. This procedure is repeated for the next access.

The predicted state vector from the dual α-β/EKF tracking loop 32 and the estimated state vector 34 from the aircraft 12 are transmitted to a processor 36 which performs data fusion and validation between the two independent measurements to obtain an improved state vector estimation. The processor 36 also receives other terrestrial based data 37, such as position of the satellite ground station 16 and position of the communication satellites 14. The improved state vector estimation is forwarded to the ATC facility 16 which then transmits this information to the aircraft 12. The improved state vector estimation 38 received by the aircraft 12 is processed by the EKF 26 to generate a new state vector.

Referring now to FIG. 3, additional details of the receiver and transmitter used in the traffic controller 16 are shown comprising transmitter 40 and a receiver 42. The ground terminal 16 transmits data which is modulated by a wavelet-based finite impulse response (WFIR) waveform with a unique AB ranging code assigned to each aircraft 12 being tracked in the access time slot. The TDMA data to the targeted aircraft is modulated by the N-chip AB code sequence, upsampled by the WFIR sample rate M, and added with signals to other aircraft sharing the same access slot. The summed output is filtered by a wideband WFIR filter with overlaid envelope of the AB ranging waveforms. A bank of narrowband WFIR filters channelizes the wideband waveform into a set of narrowband waveforms which are compatible with the satellite communication channels such as ICO.

The receive processing at the ground facility 16 is shown at 42. The baseband signal from the digitizer, shown as an analog-to-digital (A/D) function and an in-phase-quadrature (I/Q) function which may be combined is detected by a bank of narrowband (NB) WFIR filters matched to the ICO communication channels. The outputs are used to perform reconstruction of the wideband WFIR ranging signal for each aircraft. This reconstructed wideband WFIR waveform is then detected by on-time, early, and late correlators. The ranging time and data from each aircraft is recovered by separate processing which performs the A/B CDMA despreading, acquisition, tracking, time recovery, and data recovery.

Figure 4:
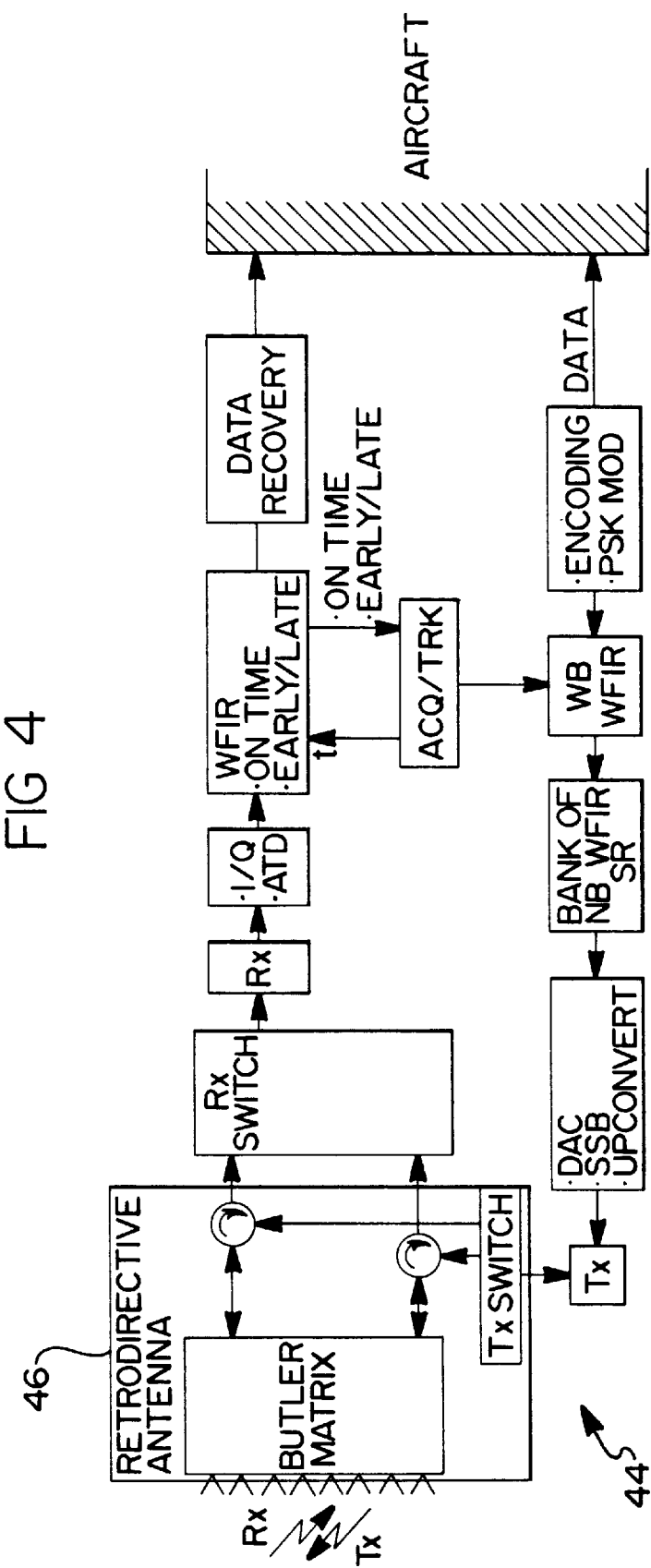
FIG. 4 is a block diagram of a preferred transmitter and a preferred receiver for a vehicle in the system of FIG. 1.

As best shown in FIG. 4, the aircraft receiver/transmitter 44 preferably includes a retrodirective antenna 46. A Butler matrix, low profile digital beam form (DBF), and WFIR signal processing are preferably employed. The retrodirective antenna 46 measures the direction of the received signal from the ICO satellite 14, and automatically transmits the return signal back to the same ICO satellite 14. The Butler matrix implements a Fourier transform forming a set of nearly orthogonal beams covering the field of view, and has been proven to be a relatively inexpensive approach to realize a retrodirective antenna. The low profile DBF array lends itself to a thin conformal array configuration which is preferred for aircraft installation. The implementation technique eliminates the need for an expensive tracking antenna on the aircraft which usually consists of either an electronically or a mechanically steered antenna driven by a monopulse, step-scanned, or conically-scanned tracking loop.

The present invention works in many multiple-satellite constellations or combinations of multiple constellations. The present invention improves position and velocity accuracy in tracking a target and provides a simple method to access more resources from space assets other than ICO constellation alone. Even if the GPS or GLONASS system malfunctions, the present invention still provides adequate position location and tracking measurements for global air traffic control without complex clock and processing requirements.

While the best modes for carrying out the invention have been described in detail, those familiar with the art to which this invention relates will recognize various alternative designs and embodiments for practicing the invention as defined by the following claims.

What is claimed is:

1. A communication system for monitoring the position and velocity of an aircraft, the system comprising:

a control station positioned on earth, the control station having a known position;

at least three satellites orbiting earth and positioned in multiple planes, each of the at least three satellites having a communication link system communicating through a respective first signal link with the control station, wherein a position of each of the at least three satellites is known such that a range between each of the at least three satellites and the control station is known; and an aircraft having a communications transceiver for sending and receiving signals to and from each of the at least three satellites through a second signal link corresponding to a respective first link, each of the corresponding first and second signal links defining a path for carrying a signal between the aircraft and the control station via a respective one of the at least three satellites, wherein each of the paths is a two-way communication between a respective one of the at least three satellites and each of the control station and the aircraft, wherein each signal includes a unique Auslander-Barbano code division multiple access (AB CDMA) signal portion assigned to the aircraft and a data message portion, the data message portion being modulated by a wavelet-based finite-impulse-response (WFIR) waveform with the AB CDMA signal portion;

wherein the control station includes a dual alpha-beta/ extended Kalman-filter tracking loop which processes the signals to determine a range between each of the at least three satellites and the aircraft as a function of time for the signals to travel the paths, the position of the aircraft as a function of the ranges and the known positions of the control station and the at least three satellites, and the velocity of the aircraft as a function of Doppler shift of each of the signals during travel of the paths.

2. The system of claim 2 wherein:

the aircraft further includes a retrodirective antenna for transmitting and receiving signals to and from the at least three satellites, wherein the retrodirective antenna determines direction of a signal received from one of the at least three satellites and transmits a signal to the one of the at least three satellites back along the direction of the received signal.

3. The system of claim 2 wherein:

the retrodirective antenna includes a Butler matrix, a digital beam former, and a wavelet-based finite-impulse-response (WFIR) signal processor.

4. The system of claim 1 wherein:

the alpha-beta tracking loop includes time and frequency tracking loops.

* * * * *